United States Patent
Schoen et al.

(10) Patent No.: US 6,324,935 B1
(45) Date of Patent: Dec. 4, 2001

(54) COLLAPSIBLE STEERING ASSEMBLY

(75) Inventors: Robert M. Schoen; Paul Thompson, both of West Bloomfield, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/444,637

(22) Filed: Nov. 22, 1999

(51) Int. Cl.[7] .................................................. B62D 1/18
(52) U.S. Cl. .................... 74/493; 74/492; 188/67; 188/371; 248/299.1; 280/775; 280/777; 280/780
(58) Field of Search .................. 74/492, 493; 188/67, 188/371; 248/298.1, 299.1; 280/775, 777, 780

(56) References Cited

U.S. PATENT DOCUMENTS

| | | | |
|---|---|---|---|
| 3,300,229 | * 1/1967 | Kishline | 280/780 |
| 3,457,800 | * 7/1969 | Toshida et al. | 74/492 |
| 3,597,994 | * 8/1971 | Shiomi et al. | 74/492 |
| 3,699,824 | * 10/1972 | Staudenmayer | 74/492 |
| 3,948,539 | 4/1976 | Murase et al. | |
| 4,000,876 | * 1/1977 | Usui et al. | 74/492 X |
| 4,330,139 | 5/1982 | Katayama | |
| 4,616,522 | 10/1986 | White et al. | |
| 4,643,448 | 2/1987 | Loren | |
| 4,746,144 | 5/1988 | Kulczyk | |
| 5,024,118 | 6/1991 | Khalifa et al. | |
| 5,228,720 | 7/1993 | Sato et al. | |
| 5,845,936 | * 12/1998 | Higashino | 280/775 |

* cited by examiner

*Primary Examiner*—Allan D. Herrmann
(74) *Attorney, Agent, or Firm*—Mark P. Calcaterra

(57) ABSTRACT

A vehicle steering assembly includes a mounting bracket for the steering column, such that during a crash situation friction surfaces on the steering column slides through an opening in a plastic block carried by the mounting bracket. The friction surfaces have an interference fit with the opening in the plastic block, so that during normal operation of the vehicle the steering column is effectively locked to the mounting bracket.

2 Claims, 1 Drawing Sheet

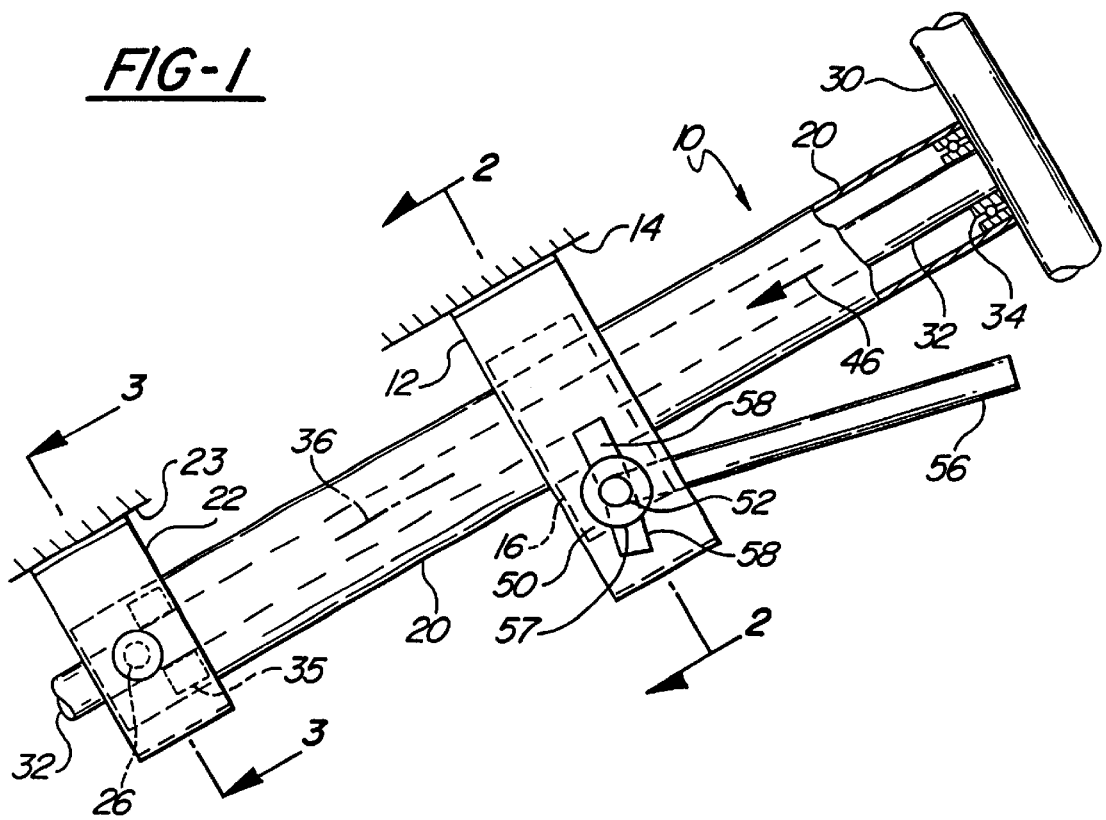
FIG-1
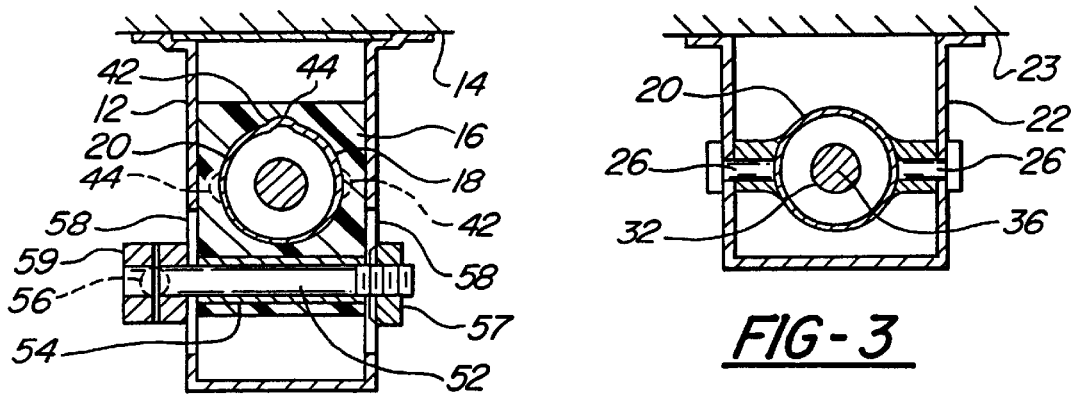
FIG-2
FIG-3
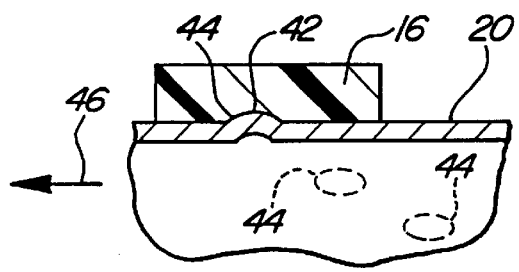
FIG-4

COLLAPSIBLE STEERING ASSEMBLY

BACKGROUND AND SUMMARY OF THE INVENTION

This invention relates to a collapsible steering assembly for an automotive vehicle, and more particularly to a steering assembly that is adapted to slide forwardly in a crash situation, thereby lessening injuries that might be experienced by the driver of the vehicle.

Collapsible steering assemblies are shown in U.S. Pat. No. 4,616,522 issued to George White et al, and U.S. Pat. No. 5,024,118 issued to Mustafa Khalifa et al. In a typical steering wheel assembly the steering column has two laterally-extending ears that have releasable connections with a mounting bracket for the steering column. These connections normally retain the steering column in a fixed condition relative to the mounting bracket. In a crash situation the body of the person in the driver seat may forcibly impact the steering wheel, thereby applying a forward force to the steering column. The connections between the aforementioned ears and the mounting bracket are released, or severed, thereby enabling the steering column to slide forward relative to the mounting bracket so as to relieve the impact force on the person in the driver seat.

The present invention relates to a collapsible steering assembly that is relatively compact and adapted for low manufacturing cost. The collapse action is achieved by means of a direct frictional connection between the steering column and a plastic block carried by the associated mounting bracket. In preferred practice of the invention the frictional connection is provided by raised surfaces on the steering column, and mating depressions formed in the plastic block. During normal operation of the vehicle the depressions frictionally grip the raised surfaces so that the steering column remains motionless relative to the mounting bracket. During a crash situation, a forward axial force on the steering column causes the raised surfaces to slide forwardly along the depressions, thereby relieving the impact force on the person in the driver seat.

The aforementioned plastic block can be designed to include a transverse mounting hole for a steering wheel lock. In one particular embodiment of the invention, a tiltable steering wheel is connected to the upper end of the steering column. The steering wheel can be tilted to various positions, and locked in place by a manually-operated lock mechanism that is mounted to the aforementioned plastic block. The plastic block thereby serves a dual purpose, first as a frictional retention means for the steering column, and second as a mounting means for the steering wheel lock mechanism.

A principal advantage of the invention is that the crash-responsive mechanism for controlling collapse of the steering column is relatively compact and adapted for relatively low manufacturing cost. Specific features of the invention will be apparent from the attached drawings and description of an illustrative embodiment of the invention.

BRIEF DESCRIPTION OF THE DRAWINGS

FIG. 1 is a fragmentary side elevational view of a vehicle steering assembly having a steering column-retention means of the present invention incorporated therein.

FIG. 2 is a transverse sectional view taken on line 2—2 in FIG. 1.

FIG. 3 is a transverse sectional view taken on line 3—3 in FIG. 1.

DESCRIPTION OF A PREFERRED EMBODIMENT OF THE INVENTION

Referring to the drawings, there is shown a steering wheel assembly 10 having a collapsibility feature according to the invention. The assembly includes a mounting bracket 12 adapted for securement to a fixed surface 14 in an automotive vehicle. Surface 14 is typically an undersurface of a high strength beam located underneath the vehicle instrument panel.

Bracket 12 has a U shaped cross section, as shown in FIG. 2, for carrying a molded plastic block 16 that has a generally circular opening 18 receiving an elongated tubular steering column 20. At its lower end, steering column 20 is pivotably attached to a mounting bracket 22 that is secured to a fixed mounting surface 23. As illustratively shown in FIG. 3, steering column 20 has laterally extending pivot pins 26 that extend through mounting holes in bracket 22, to provide pivotal support for the steering column. The pivotal connections between the steering column and mounting bracket can take various forms. The pivotal connections are designed to be severed, or broken in response to a crash situation involving forward motion of steering wheel 30, as denoted by arrow 46 in FIG. 1.

During normal operation of the automotive vehicle, steering column 20 is fastened to plastic block 16; column 20 can pivot around the pin 26 axis, but otherwise cannot move.

Steering of the vehicle is accomplished by means of a circular steering wheel 30 fastened to the upper end of a steering shaft 32. Bearings 34 and 35 are mounted in steering column 20 to provide rotational support for shaft 32. Shaft 32 can rotate around the shaft axis 36 in response to manual rotation of steering wheel 30.

Shaft 32 is connected to a second elongated lower drive shaft via a universal joint, whose rotational center is located below bracket 22. Upper shaft 32 remains concentric with housing 24 in all tilted positions of the housing, such that the drive shaft assembly is rotatably operational, irrespective of the tilted position of steering wheel 30.

Plastic block 16 has plural depressions 42 formed in the side surface of circular opening 18. Steering column 20 has plural raised surfaces 44 mating with depressions 42, whereby the steering column is frictionally locked to plastic block 16 during normal operation of the steering wheel assembly. In preferred practice of the invention, the plastic block is molded onto the steering column to achieve the interlocking relation between the raised surfaces 44 and depressions 42. As a result, the steering column has an interference fit in opening 18 of plastic block 16.

The number of raised surfaces 44 on steering column 20 can be varied, according to the desired frictional resistance that is to be achieved during a crash situation involving forward motion of the steering wheel. The raised surfaces can take various forms and configurations, e.g. splines, knurling, transverse serrations, or projections designed to frictionally interact with mating depressions in the surface of plastic block 16, to absorb kinetic energy, during forward motion of steering wheel 30 in a crash situation. The heights of raised surfaces 44 can be varied, according to the desired stroke displacement and snubbing action that is to be achieved.

FIG. 1 represents the normal operating position of the steering column, wherein the column is frictionally locked to block 16 with a predetermined frictional lock force.

During a crash situation, (e.g. a front end collision), the steering column can be subjected to a relatively high impact force in the arrow 46 direction. The steering wheel and column 20 move in the arrow 46 direction, such that raised surfaces 44 move along the inner surface of block 16 during the process of overcoming the initial friction lock force between the raised surfaces and the depressions 42. The plastic block remains with the bracket 12. Some displacement of the plastic material will occur.

As steering column 20 moves incrementally in the arrow 46 direction the frictional lock force increases, due partly to the fact that the total raised surface area 44 in contact with the plastic surface is progressively increased. Frictional resistance to steering column deflection increases to provide a snubbing force that achieves a relatively controlled deceleration of the steering column and steering wheel. The result is a lessening of any injury that the person in the driver seat might experience due to forcible impact with the steering wheel.

During normal operation of the vehicle the steering wheel can be locked in a range of different tilted positions, by means of a lock means 50 mounted on plastic block 16. The lock means can take various forms. As shown in the drawings, lock means 50 includes a transverse shaft 52 extending through a sleeve 54 molded into block 16. A manual handle 56 is connected to one end of shaft 52; the handle includes a hub 59 secured to shaft. A nut 57 is threaded onto the other end of shaft. As shown in FIG. 1, shaft 52 extends through two arcuate slots 58 in bracket 12, whereby the steering column can pivot (or swing) around the pivot axis defined by pivot pins 26.

Nut 57 has a rib fitting into the associated slot 58, so that the nut is precluded from turning around the nut axis. During normal operation of the steering wheel assembly, nut 57 and hub portion 59 of handle 56 exert a squeezing frictional force on the side walls of bracket 12, so that steering column 20 is retained in an adjusted position of tilt. When lever 56 is manually lowered, the spacing between nut 57 and hub 59 is slightly increased, whereby the frictional force is decreased (or removed) to permit the steering column to be moved to a different tilted position. Lever 56 can then be manually raised to restore the frictional locking force of hub 59 and nut 57 on bracket 12. Nut 57 serves as a locking element.

As previously noted, the lock means 50 can take various forms. Whatever the lock mechanism construction, bracket 12 and plastic block 16 provide a convenient mounting device for the steering wheel tilt lock mechanism.

A primary feature of the invention is embodied in bracket 12 and plastic block 16. The plastic block has a strong frictional engagement with the outer side surface of steering column 20, whereby the steering column is normally retained in a fixed position relative to mounting bracket 12. During a crash situation the steering column is enabled to have limited axial motion through opening 18 in block 16. The plastic block 16 provides a compact low cost mechanism for achieving a controlled forward motion of the steering column during a front end collision event.

What is claimed:

1. A crash-responsive collapsible steering assembly comprising:
    a mounting bracket adapted for fixed disposition in an automotive vehicle;
    a tubular steering column extending through said mounting bracket; and
    a column-retention means carried on said bracket, said column-retention means being in a frictional engagement with said tubular steering column so that said column is normally motionless relative to said mounting bracket, and a molded plastic block including an opening sized to fit the steering column, said steering column having plural circumferentially-spaced raised surfaces, and said molded plastic block having plural mating depressions in the surface of said opening, whereby said raised surfaces have frictional engagement with said depressions;
    the frictional engagement between said raised surfaces and said depressions being such that in a crash situation the steering column is enabled to have limited axial motion through the molded plastic block.

2. A crash-responsive collapsible steering assembly comprising:
    a mounting bracket adapted for fixed disposition in an automotive vehicle;
    a tubular steering column extending through said mounting bracket;
    a steering column-retention means carried on said bracket, said column-retention means comprising a molded plastic block having an opening sized to fit the steering column, said steering column having plural circumferentially-spaced raised surfaces, and said molded plastic block having plural mating depressions in the surface of said opening, whereby said raised surfaces have frictional engagement with said depressions;
    the frictional engagement between said raised surfaces and said depressions being such that in a crash situation the steering column is enabled to have limited axial motion through the molded plastic block; and
    a steering wheel tilt lock means mounted on said plastic block; said lock means comprising a rotary shaft extending transversely through said plastic block, a handle connected to one of said shaft, and a lock element connected to the other end of said shaft.

* * * * *